(12) United States Patent
dos Santos e Lucato et al.

(10) Patent No.: US 8,590,842 B2
(45) Date of Patent: Nov. 26, 2013

(54) TAILORABLE STIFFNESS SHAPE MORPHING FLOW-PATH

(75) Inventors: Sergio L. dos Santos e Lucato, Thousand Oaks, CA (US); David B. Marshall, Thousand Oaks, CA (US); Daniel Edward Driemeyer, Manchester, MO (US)

(73) Assignee: The Boeing Company, Chicago, IL (US)

( * ) Notice: Subject to any disclaimer, the term of this patent is extended or adjusted under 35 U.S.C. 154(b) by 1345 days.

(21) Appl. No.: 12/406,644

(22) Filed: Mar. 18, 2009

(65) Prior Publication Data

US 2011/0180145 A1 Jul. 28, 2011

(51) Int. Cl.
*B64C 13/16* (2006.01)
(52) U.S. Cl.
USPC .......................................................... 244/203
(58) Field of Classification Search
USPC ............. 244/53 B, 133, 119, 123.4, 38, 53 R, 244/99.8; 137/15.2, 15.1
See application file for complete search history.

(56) References Cited

U.S. PATENT DOCUMENTS

| 3,265,331 A | * | 8/1966 | Miles ........................... 244/53 B |
| 5,174,524 A | * | 12/1992 | Amneus, III ................. 244/53 B |
| 5,787,703 A | * | 8/1998 | Fougerousse ................... 60/225 |
| 5,887,828 A | * | 3/1999 | Appa ............................ 244/215 |
| 6,070,834 A | * | 6/2000 | Janker et al. .................... 244/219 |
| 6,276,641 B1 | * | 8/2001 | Gruenewald et al. ......... 244/213 |
| 6,375,127 B1 | * | 4/2002 | Appa ............................ 244/215 |
| 7,048,229 B2 | * | 5/2006 | Sanders et al. .............. 244/53 B |
| 7,516,918 B2 | * | 4/2009 | Cox et al. ..................... 244/53 R |
| 7,530,533 B2 | * | 5/2009 | Perez-Sanchez ............. 244/219 |
| 7,717,373 B2 | * | 5/2010 | Jaenker ......................... 244/218 |
| 7,909,292 B2 | * | 3/2011 | Law .............................. 244/219 |
| 8,262,030 B2 | * | 9/2012 | Phillips ........................ 244/203 |
| 2007/0262201 A1 | | 11/2007 | Cox et al. |

OTHER PUBLICATIONS

Steeves et al., "A Morphing Structure for an Adaptive Wind Tunnel Nozzle", 2006 National Space & Missile Materials Symposium, Jun. 26-30, 2006, Orlando, Florida, pp. 1-11.
Weisshaar, "Morphing Aircraft Technology—New Shapes for Aircraft Design", NATO, OTAN, RTO-MP-AVT-141, Oct. 1, 2006, pp. 1-20.

* cited by examiner

*Primary Examiner* — Richard Price, Jr.
(74) *Attorney, Agent, or Firm* — Yee & Associates, P.C.

(57) ABSTRACT

An apparatus and method for an improved morphing flow path. A flexible structure has a plurality of sections which include a first section and a second section. An actuator system is connected to the flexible structure and includes a number of actuators. The actuator system is capable of changing a configuration of the flexible structure. A controller is connected to the actuator system. The controller is capable of changing a position of a number of actuators within the actuator system.

20 Claims, 6 Drawing Sheets

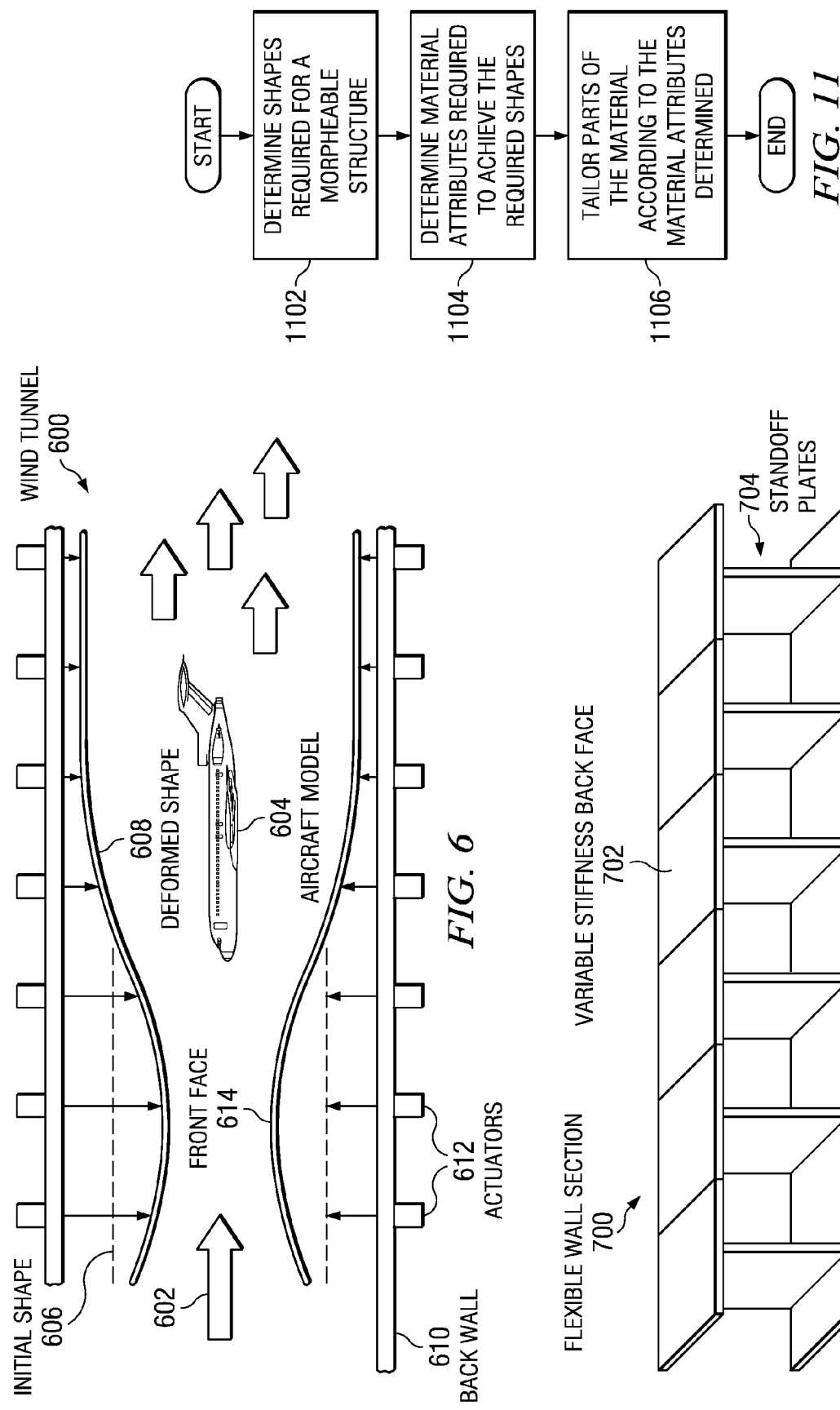

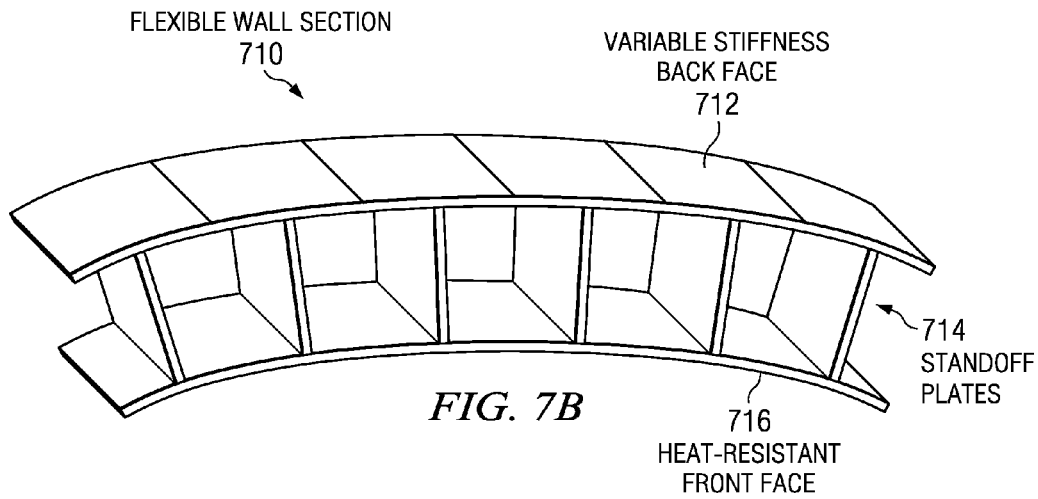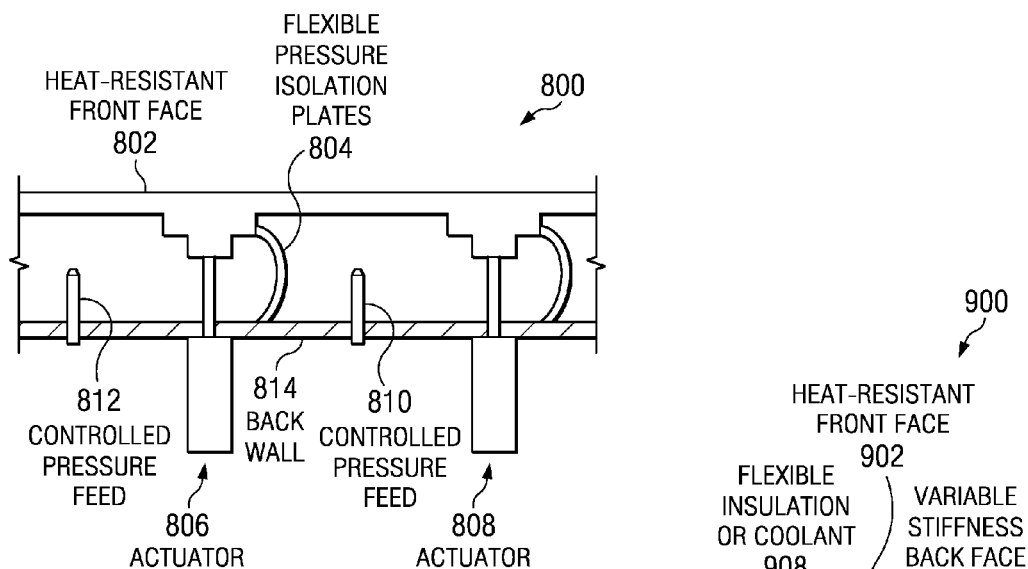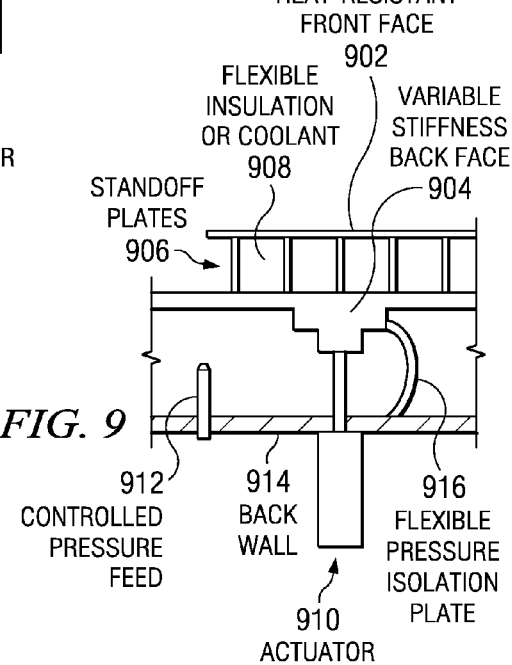

TAILORABLE STIFFNESS SHAPE MORPHING FLOW-PATH

BACKGROUND INFORMATION

1. Field

The present disclosure relates generally to a flexible structure, and more specifically to an improved morphing flow path.

2. Background

In a hypersonic aircraft or missile that includes a scramjet or ramjet engine, forward speed of the hypersonic air vehicle compresses airflow as it enters a duct of an air inlet of the scramjet or ramjet engine and passes through the engine. This compression increases the air pressure to a pressure higher than that of the surrounding air. In a combustor of the scramjet or ramjet engine, fuel is ignited in the airflow. Rapid expansion of hot air out an exhaust nozzle of the scramjet engine produces thrust.

The optimum shape of the duct depends on the speed of the hypersonic aircraft or missile. Therefore, for optimum performance, the shape of the duct must change as the hypersonic air vehicle flies. Typically, the shape of the duct has been changed by mechanically moving large panels. This approach involves the use of hinges and sliding mechanisms, which are heavy and add to the weight of an air vehicle. These types of mechanisms also have hot seals that can experience difficulties. Also, the use of these mechanisms may require increased maintenance, which may take the vehicle out of service for a period of time.

Therefore, it would be advantageous to have a method and apparatus that overcomes the issues above.

SUMMARY

The illustrative embodiments provide an apparatus and method for an improved morphing flow path. In an illustrative embodiment, a flexible structure has a plurality of sections which include a first section and a second section. An actuator system is connected to the flexible structure and includes a number of actuators. The actuator system is capable of changing a configuration of the flexible structure. A controller is connected to the actuator system. The controller is capable of changing a position of a number of actuators within the actuator system.

In another illustrative embodiment, a number of shapes required for a flexible structure is determined. Material attributes required to achieve the number of shapes are determined and the structure properties are varied along the length to achieve the desired shapes using a reduced number of actuators.

The features, functions, and advantages can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is a block diagram of a morphing wind tunnel in accordance with an advantageous embodiment;

FIGS. 7A-7B are a block diagram of a flexible wall section in accordance with an advantageous embodiment;

FIG. 8 is a block diagram of a flexible wall system in accordance with an advantageous embodiment;

FIG. 9 is a block diagram of a flexible wall system in accordance with an advantageous embodiment.

FIG. 11 is a flowchart illustrating a process for manufacturing a flexible plate in accordance with an illustrative embodiment.

DETAILED DESCRIPTION

Figure 1:
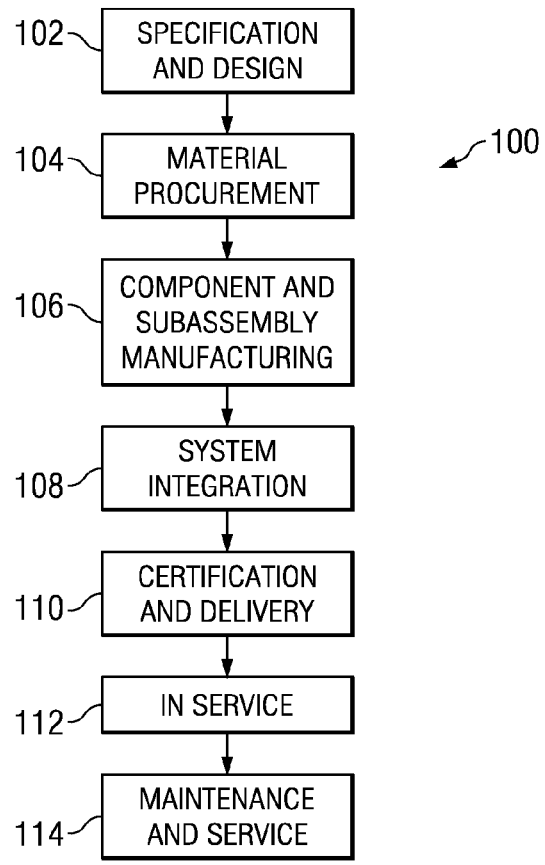
FIG. 1 is a flow diagram of aircraft production and service methodology in accordance with an advantageous embodiment.
Figure 2:
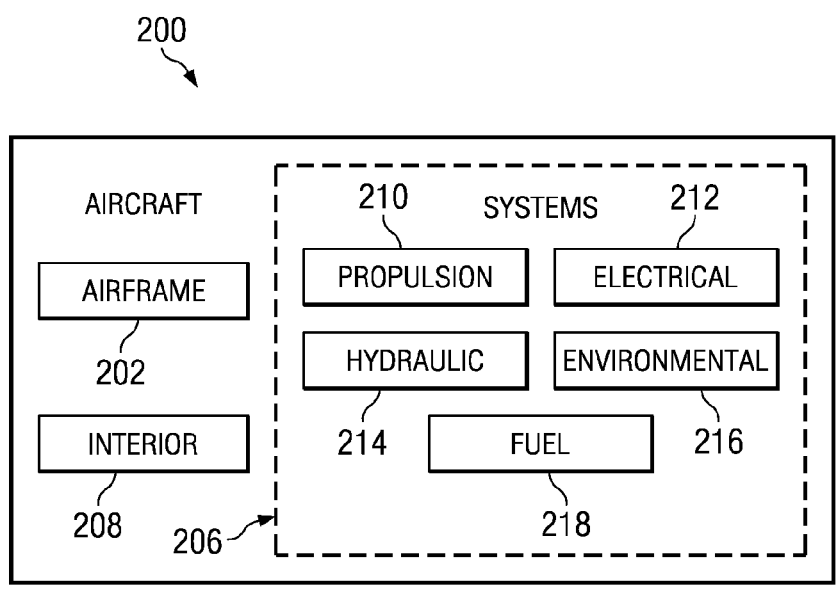
FIG. 2 is a block diagram of an aircraft in accordance with an advantageous embodiment.

Referring more particularly to the drawings, embodiments of the disclosure may be described in the context of an aircraft manufacturing and service method 100 as shown in FIG. 1 and an aircraft 200 as shown in FIG. 2. During pre-production, exemplary method 100 may include specification and design 102 of the aircraft 200 and material procurement 104. During production, component and subassembly manufacturing 106 and system integration 108 of the aircraft 200 takes place. Thereafter, the aircraft 200 may go through certification and delivery 110 in order to be placed in service 112. While in service by a customer, the aircraft 200 is scheduled for routine maintenance and service 114, which may also include modification, reconfiguration, refurbishment, and so on.

Each of the processes of method 100 may be performed or carried out by a system integrator, a third party, and/or an operator, such as a customer. For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 200 produced by exemplary method 100 may include an airframe 202 with a plurality of systems 206 and an interior 208. Examples of high-level systems 206 include one or more of a propulsion system 210, an electrical system 212, a hydraulic system 214, an environmental system 216, and a fuel system 218. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 106 may be fabricated or manufactured in a manner similar to components or subassemblies produced while the aircraft 200 is in service. Also, one or more apparatus embodiments, method embodiments, or a combination thereof may be utilized during the production stages 106 and 108, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 114. Illustrative embodiments of the invention may be employed in airframe 202 and interior 208 of aircraft 200. Illustrative embodiments of the invention may also be employed in systems 206 of aircraft 200, such as propulsion system 210, hydraulic system 214, and fuel system 218.

The different illustrative embodiments recognize a need for a low complexity morphing system capable of actuating against high external forces and high temperatures. The different illustrative embodiments recognize that current methods achieve desired shapes by bending solid homogenous structures, which require a large number of actuators, increasing the complexity of the system. Current methods can only achieve high temperature capabilities by including an active cooling system or passive brittle thermal barrier coatings, both of which add to the complexity and weight of the system and limit the shape changing ability of the system.

Therefore, the illustrative embodiments provide an apparatus and method for an improved morphing flow path exposed to high temperature and/or pressure environments. A flow path defines the path of airflow through or over a structure. A structure may be, for example, a ramjet or scramjet engine duct, a wind tunnel, or an external aircraft wing or control surface. The formation of the flow path is determined by the design of the engine or the aircraft maneuvering/control characteristics and depends on the vehicle air speed and altitude. Morphing refers to the change in shape or form of an object or structure. A morphing flow path is an airflow path that undergoes a change, or morph, in configuration due to a change in shape or form of the object or structure the airflow is traveling through or over.

In an illustrative embodiment, a flexible structure has a plurality of sections in which a first portion of the plurality of sections has a number of attributes that provide a different flexibility from a second portion of the plurality of sections. An actuator system is connected to the flexible structure and the actuator system is capable of changing the configuration of the flexible structure. A controller is connected to the actuator system. The controller is capable of changing a position of a number of actuatable elements within the actuator system.

In another illustrative embodiment, a number of shapes required for a flexible structure is determined. Material attributes required to achieve the number of shapes are determined and the structure properties are varied along the length to achieve the desired shapes using a reduced number of actuators. A number as used herein refers to one or more items. For example, a number of shapes is one or more shapes.

In a third illustrative embodiment, the flexible structure could be used to control the external air flow over a hypersonic vehicle. This would include changing the shape of a wing or other vertical/horizontal stabilizing surfaces on the aircraft or missile. The shape of these external surfaces could be adjusted to maintain flight stability control or implement active maneuvering using the same flexible structures and actuation schemes as envisioned for the internal engine flow paths.

As a result, the illustrative embodiments improve the capabilities of a shape morphing system to withstand high pressures and temperatures and actuate effectively in conditions presenting both high pressure and temperature. The locally tailored portions of the system improve the shape changing capabilities as well, all in a low complexity system.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
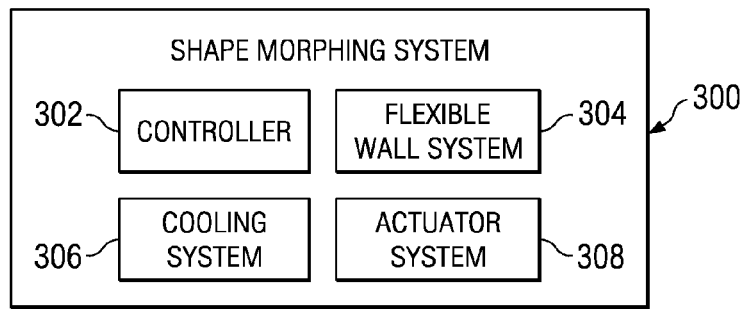
FIG. 3 is a block diagram of a shape morphing system in accordance with an advantageous embodiment.

With reference now to FIG. 3, a block diagram of a shape morphing system for a flexible structure is depicted in accordance with an advantageous embodiment. A flexible structure is a structure that is capable of undergoing a change in shape or form during a seamless transition. A flexible structure may also be referred to as a morpheable structure. Shape morphing system 300 is one example of a system in which a flexible wall system may be implemented. In an illustrative embodiment, shape morphing system 300 may be implemented in an object such as, without limitation, a wind tunnel, an aircraft or missile engine, or an external aircraft, missile, or high-speed projectile control surface. An aircraft or missile engine may be, for example, without limitation, a ramjet or scramjet engine. A wind tunnel is used to study the effects of air moving over or around solid objects, such as an aircraft, missile, or sub-scale models of these vehicles. An external control surface may include, for example, without limitation, canards, flaps, fins, winglets, strakes, and vertical/horizontal stabilizers. Shape morphing system 300 includes controller 302, flexible wall system 304, cooling system 306, and actuator system 308.

Controller 302 is a processor or computer in which computer usable program code or instructions may be located for the illustrative embodiments. These coded algorithms translate desired aircraft, missile, projectile, or engine response characteristics into the flexible structure shape(s) that will produce this response. Controller 302 adjusts the time-dependent movement and shape of the flexible wall system 304 through the actuator system 308. Actuator system 308 may include a number of actuators. As used herein, a number is used to describe one or more of an item.

For example, in one illustrative embodiment, actuator system 308 may include one actuator. In another illustrative embodiment, actuator system 308 may include two or more actuators. An actuator may be any type of device for moving or controlling the structural shape. In one illustrative embodiment, actuator system 308 includes linear actuators, such as, without limitation, hydraulic actuator, piezoelectric actuator, electro-mechanical actuator, linear motor, or some other type of linear actuator. Actuator system 308 can actuate against high external forces, giving a flexible structure high authority. High authority, in this context, refers to the ability of a flexible structure to undergo large deformation against high external forces on a time scale that is consistent with the system control objectives.

Actuator system 308 moves or controls flexible wall system 304 by applying force to a number of areas in a flexible structure in order to change, or morph, the shape of the structure. Actuator system 308 is capable of generating force against external forces. In an illustrative example, external forces may reach pressures in excess of fifteen pounds per square inch (15 psi) during the operation of an engine, such as a ramjet or scramjet engine. Actuator system 308 moves or controls flexible wall system 304 by applying force to a number of areas of a wall in order to change, or morph, the shape of the wall.

In an illustrative embodiment, standoff plates may be integrated with cooling system 306. Cooling system 306 controls the temperature of flexible wall system 304 and actuator system 308. Cooling system 306 may use either an active coolant or passive coolant. Active coolant may be, for example, a fluid which flows through an object or structure in order to prevent it from overheating. An active coolant transfers the heat produced by the object or structure, or exposed to the object or structure, to other objects that utilize or dissipate it. Passive coolant may be, for example, a type of flexible thermal insulation. An example of a coolant that can be used is a coolant with high thermal capacity, low viscosity, that is low-cost, and is chemically inert, neither causing nor promoting corrosion of cooling system 306. Another illustrative example of a suitable coolant is the fuel used for combustion in the engine.

Figure 4:
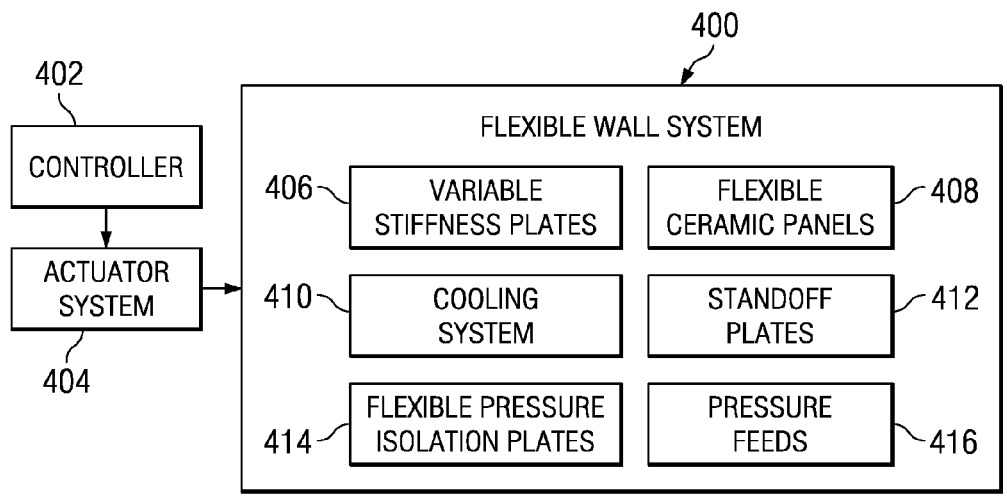
FIG. 4 is a block diagram of a flexible wall system in accordance with an advantageous embodiment.

With reference now to FIG. 4, a block diagram of a flexible wall system is depicted in accordance with an advantageous embodiment. Flexible wall system 400 is an example of a flexible wall system implemented in a shape morphing system such as flexible wall system 304 in shape morphing system 300 of FIG. 3.

Flexible wall system 400 is controlled by controller 402 through actuator system 404. In some advantageous embodiments, flexible wall system 400 may include attributes such as, without limitation, variable stiffness plates 406, flexible ceramic panels 408, standoff plates 412, flexible pressure isolation plates 414, and pressure feeds 416. Controller 402, cooling system 410, and actuator system 404 are examples of one implementation of controller 302, cooling system 306, and actuator system 308 in FIG. 3. In some other advantageous embodiments, controller 402, cooling system 410, and actuator system 404 may also be attributes of flexible wall system 400.

In some instances, flexible wall system 400 includes a back-face, such as variable stiffness back-face 702 in FIG. 7, composed of variable stiffness plates 406 and a front-face, such as heat-resistant front-face 706 in FIG. 7, composed of heat-resistant panels, such as flexible ceramic panels 408. Variable stiffness plates 406 can be tailored or selected during manufacturing and assembly to provide the desired flexibility for each plate. In this instance, each plate may have a different flexibility, or stiffness. The variable stiffness plates may also be referred to as tailorable stiffness plates.

The desired flexibility for each plate is achieved by modifying the plate stiffness (i.e. tailorable stiffness). This may be achieved through varying, for example, without limitation, the thickness of the plates, the type of material used to manufacture the plates, or the filler materials or fiber layup used to manufacture the plates. In the illustrative example of varying the thickness of the plates, the thickness of the plates is varied in discrete steps along the length of the plates. If more flexibility is desired, the thickness would be diminished in one or more parts of the plate. In the illustrative example of varying the type of material used to manufacture the plates, a more flexible, or less stiff, material is used in one or more parts of the plate where a wider range of morphing or shape change is desired. A stiffer, less flexible material may be used in one or more parts of the plate where a lesser range of morphing is desired. In the illustrative example of varying the filler materials or fiber layup used to manufacture the plates, plate bending stiffness is tailored by varying material components or fiber layup used throughout sections or portions of the plate. The tailored stiffness plates provide the morphing capabilities by having a design that assumes the desired change of shape when force is applied by actuator system 404.

Actuator system 404 moves or controls flexible wall system 400 by applying force to a number of areas of a wall, such as variable stiffness plates 406 and/or flexible ceramic plates 408, in order to change, or morph, the shape of the wall. Actuator system 404 is capable of generating force against external forces. In an illustrative example, external forces may reach pressures in excess of fifteen pounds per square inch (15 psi) during the operation of an engine, such as a ramjet or scramjet engine.

In one advantageous embodiment, a characteristic of flexible wall system 400 involves the use of heat-resistant flexible ceramic panels 408 that are capable of withstanding temperatures in excess of 3500° F. during operation and thermally isolating the hot surfaces from actuator system 404. Temperatures during operation of an engine, for example, may be due to combustion occurring within the engine. In one example, gas temperatures in an engine of a super or hyper-sonic aircraft or missile may reach up to 4000° F. during operation.

In another advantageous embodiment, flexible wall system 400 may also include standoff plates 412 that further separate the heat-resistant panels from variable stiffness plates 406. Standoff plates 412 are rigid structures that transfer the placement of force against variable stiffness plates 406 to flexible ceramic panels 408. This transfer of force allows a change in shape applied to variable stiffness plates 406 to be transferred to flexible ceramic panels 408.

Flexible ceramic panels 408 may be any type of heat-resistant panels that are capable of withstanding temperatures during operation and isolating hot surfaces from actuator system 404. These heat-resistant panels may be, for example, without limitation, a ceramic matrix composite, thin flexible ceramic, or some other suitable material that is oxidation resistant. Flexible ceramic panels 408 may be separate from variable stiffness plates 406, or may themselves include the variable stiffness features.

Standoff plates 412 and flexible pressure isolation plates 414 are optional features of flexible wall system 400. Standoff plates 412 and flexible pressure isolation plates 414 may be used to separate flexible ceramic panels 408 from variable stiffness plates 406. Flexible pressure isolation plates 414 include seals. Flexible pressure isolation plates 414 act to separate the system into two or more areas with different pressures that will closely match that of the engine on the other side of flexible wall system 400 at that area of the engine. The seals are used to seal flexible pressure isolation plates 414 against other components of the engine and flexible wall system 400 that are in contact with them. In an illustrative example, the seals may be made of rubber, silicone, metals or ceramic fibers depending on where they are located and what temperature they will have to operate in.

The internal pressure varies significantly down the length of an engine flow path or wind tunnel. Flexible isolation plates 414 may be added along the morphing structure length to form locally closed volumes behind flexible ceramic panels 408. These closed volumes provide the capability to introduce local pressure variations behind flexible ceramic panels 408. Pressure feeds 416 raise or lower the local pressure behind flexible wall system 400 to closely match that pressure in front of flexible wall system 400, leading to a low-level pressure differential across the wall. In one illustrative example, if the pressures on both sides of flexible wall system 400 are similar, the driving force for combustion gases to pass by the seals is lower and the seals requirements are relaxed. In another illustrative example, if the pressure behind the flexible wall system 400 is higher than in front, seals might not be required at all.

The different components illustrated in flexible wall system 400 are not meant to provide physical or architectural limitations to the manner in which different advantageous embodiments may be implemented. The different illustrative embodiments may be implemented in a flexible wall system including components in addition to or in place of those illustrated for flexible wall system 400. Other components shown in FIG. 4 can be varied from the illustrative examples shown. For example, controller 402 and actuator system 404 may be integrated within flexible wall system 400 rather than separate components as depicted above.

Figure 5:
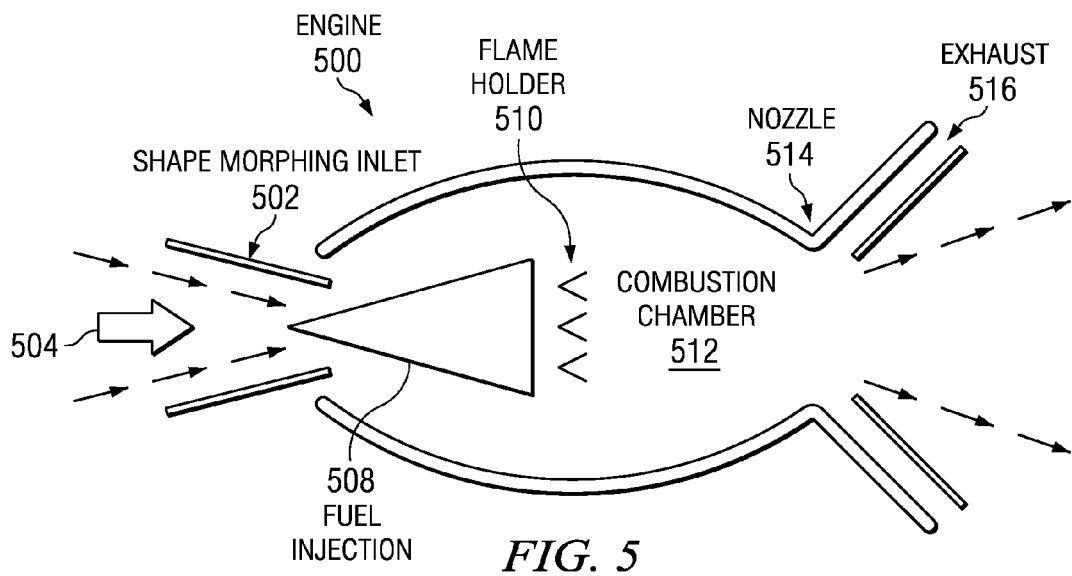
FIG. 5 is a block diagram of an aircraft engine in accordance with an advantageous embodiment.

With reference now to FIG. 5, a diagram of an aircraft or missile engine is depicted in accordance with an advantageous embodiment. Engine 500 is an example of a flexible structure in which shape morphing system 300 in FIG. 3 may be implemented. Engine 500 may be, for example, without limitation, a ramjet or scramjet engine of a hypersonic aircraft or missile.

Shape morphing inlet 502 is an example of one implementation of flexible wall system 400 in FIG. 4. Shape morphing inlet 502 may morph, or change shape or form, during flight according to material attributes, such as a tailored thickness or type of material used to manufacture variable stiffness plates, of shape morphing inlet 502. In one advantageous embodiment, shape morphing inlet 502 may be an example of one implementation of variable stiffness plates 406 in FIG. 4. In another advantageous embodiment, shape morphing inlet 502 may be an example of one implementation of flexible ceramic panels 408 in FIG. 4. In yet another advantageous embodiment, as illustrated in FIG. 10, shape morphing inlet 502 may include separate variable stiffness plates 406 (back face 1004) and flexible ceramic panels 408 (front face 1006) that are linked by standoff plates 412 (standoff plates 1008).

Arrow 504 is an example of a morphing flow path. Arrow 504 illustrates the flow path of airflow into shape morphing inlet 502, the portion of engine 500 where air intake occurs. Air is compressed as it flows through shape morphing inlet 502 and past fuel injection 508. Fuel injection 508 allows fuel to interact with the incoming air, which acts as an oxidizer, and a spark created by flame holder 510 to create combustion within combustion chamber 512. This exothermic reaction creates gases that reach high temperatures and pressures, and are permitted to expand. This expansion forces the air past nozzle 514 out the back of engine 500 in the form of exhaust 516. In an illustrative embodiment, high temperatures may be temperatures that exceed 3500° F. In another illustrative embodiment, high pressures may be pressures that exceed 15 psi.

Shape morphing inlet 502 must withstand the temperature and pressure created during shock compression and slowing of the incoming flow, and be able to morph, or change shape, to accommodate the varying amount of incoming air flow encountered at different flight altitudes and air speeds while maintaining an optimal pressure for combustion. The optimal pressure is determined by the current condition of the engine and changes continuously throughout the flight.

With reference now to FIG. 6, a block diagram of a morphing wind tunnel is depicted in accordance with an advantageous embodiment. Wind tunnel 600 is an example of a flexible structure in which shape morphing system 300 in FIG. 3 may be implemented. Aircraft model 604 is an example of an aircraft or missile model used in a wind tunnel, for example.

Arrow 602 represents the flow path of airflow through wind tunnel 600. Arrow 602 is an example of a morphing flow path through wind tunnel 600. Aircraft model 604 flies against the air flow depicted by arrow 602. The flexible wall system of wind tunnel 600 allows for an initial shape 606 to be morphed into a deformed shape 608 to simulate different air flow velocity and pressure regimes that an aircraft or missile will experience during operation. Back wall 610 may include attached actuators 612, which are examples of actuators that may be a part of an actuator system, such as actuator system 404 in FIG. 4. Actuators 612 move and/or control front face 614 of wind tunnel 600 by applying force to a number of areas of front face 614 in order to change, or morph, the shape of front face 614.

In one advantageous embodiment, front face 614 may be a heat-resistant front face made of heat-resistant panels, such as flexible ceramic panels 408 in FIG. 4. In another advantageous embodiment, front face 614 may include a heat-resistant front face, a variable stiffness back face, and standoff plates, such as standoff plates 412 in FIG. 4. In this illustrative example, the heat-resistant front face may be made of heat-resistant panels, such as flexible ceramic panels 408 in FIG. 4, and the variable stiffness back face may be made of variable stiffness plates, such as variable stiffness plates 406 in FIG. 4.

With reference now to FIGS. 7A-7B, a block diagram of a flexible wall section is depicted in accordance with an advantageous embodiment. Flexible wall section 700 and flexible wall section 710 are examples of a section of a flexible wall, such as shape morphing inlet 502 in FIG. 5, or front face 614 in FIG. 6, for example. Flexible wall section 700 and flexible wall section 710 may be implemented in a flexible wall system such as flexible wall system 400 in FIG. 4.

Flexible wall section 700 includes variable stiffness back face 702, standoff plates 704, and heat-resistant front face 706. Variable stiffness back face 702 is an example of variable stiffness plates 406 in FIG. 4. Standoff plates 704 are an example of standoff plates 412 in FIG. 4, and may also be incorporated with a cooling system, such as cooling system 410 in FIG. 4. Heat-resistant front face 706 is an example of flexible ceramic panels 408 in FIG. 4.

Flexible wall section 710 depicts a section of a flexible wall structure in which a shape change, or morph, has occurred based on force from an actuator system. The result is a different shape than that of flexible wall section 700. The shape may be any number of shapes that variable stiffness back face 712, standoff plates 714, and heat-resistant front face 716 of flexible wall section 710 are designed to achieve.

With reference now to FIG. 8, a block diagram of a flexible wall system is depicted in accordance with an advantageous embodiment. Flexible wall system 800 is an example of one implementation of flexible wall system 400 in FIG. 4 where a variable stiffness back face, such as variable stiffness back face 702 in FIG. 7, is not required. FIG. 8 represents one advantageous embodiment in which flexible pressure isolation plates 804 are introduced into the flexible heat-resistant wall design.

Flexible wall system 800 includes heat-resistant front face 802, flexible pressure isolation plates 804, actuator 806, actuator 808, controlled pressure feed 810, controlled pressure feed 812, and back wall 814. Heat-resistant front face 802 includes a variable stiffness feature, such as variable stiffness plates 406 in FIG. 4, that provides for direct control of the flexible wall shape by the actuator system against heat-resistant front face 802. In this example, heat-resistant front face 802 is composed of heat-resistant or ceramic materials, such as flexible ceramic panels 408 in FIG. 4.

Flexible pressure isolation plates 804 act to separate the flexible wall into two or more lateral sections with different local pressures in the volume between heat-resistant front face 802 and back wall 814.

Actuators 806 and 808 may mechanically move heat-resistant front face 802 to change the shape of the outer wall by applying force against heat-resistant front face 802. Controlled pressure feeds 810 and 812 adjust the pressure between back wall 814 and heat-resistant front face 802 to a level similar to the pressure acting on the front side of heat-resistant front face 802, thus reducing the amount of force required by actuators 806 and 808.

In this illustrative example, flexible wall system 800 achieves morphing, or a change in shape or form, when actuators 806 and 808 apply force to heat-resistant front face 802. The thickness or type of material used when manufacturing heat-resistant front face 802 will determine the degree of flexibility of the wall, affecting the number of shapes that may be achieved.

With reference now to FIG. 9, a block diagram of a flexible wall system is depicted in accordance with an advantageous embodiment. Flexible wall system 900 is an example of one implementation of flexible wall system 400 in FIG. 4. FIG. 9 represents a flexible wall system embodiment in which the heat resistant front face 902 is separated from the variable stiffness back face 904 by standoff plates 906 to form a sandwich structure. Flexible insulation or coolant 908 may be arranged within or flowing through the space between standoff plates 906 to keep the heat from heat-resistant front face 902 from transferring back to variable stiffness back face 904 and actuator 910.

Flexible wall system 900 again includes actuator 910, controlled pressure feed 912, back wall 914, and flexible pressure isolation plate 916. Heat-resistant front face 902 is composed of heat-resistant or ceramic materials, such as flexible ceramic panels 408 in FIG. 4.

Controlled pressure feed 912 adjusts the pressure between back wall 914 and variable stiffness back face 904 to a level similar to the pressure acting on the front of heat-resistant front face 902, thus reducing the amount of force required by actuator 910.

Flexible pressure isolation plates 916 act to separate the flexible wall into two or more lateral sections with different local pressures in the volume between variable stiffness back face 904 and back wall 914.

In this illustrative example, flexible wall system 900 achieves morphing when actuator 912 applies force to variable stiffness back face 904. The force applied to variable stiffness back face 904 is transferred to heat-resistant front face 902 through standoff plates 906. The shape resulting from the force applied to variable stiffness back face 904 is replicated in heat-resistant front face 902.

Figure 10A:
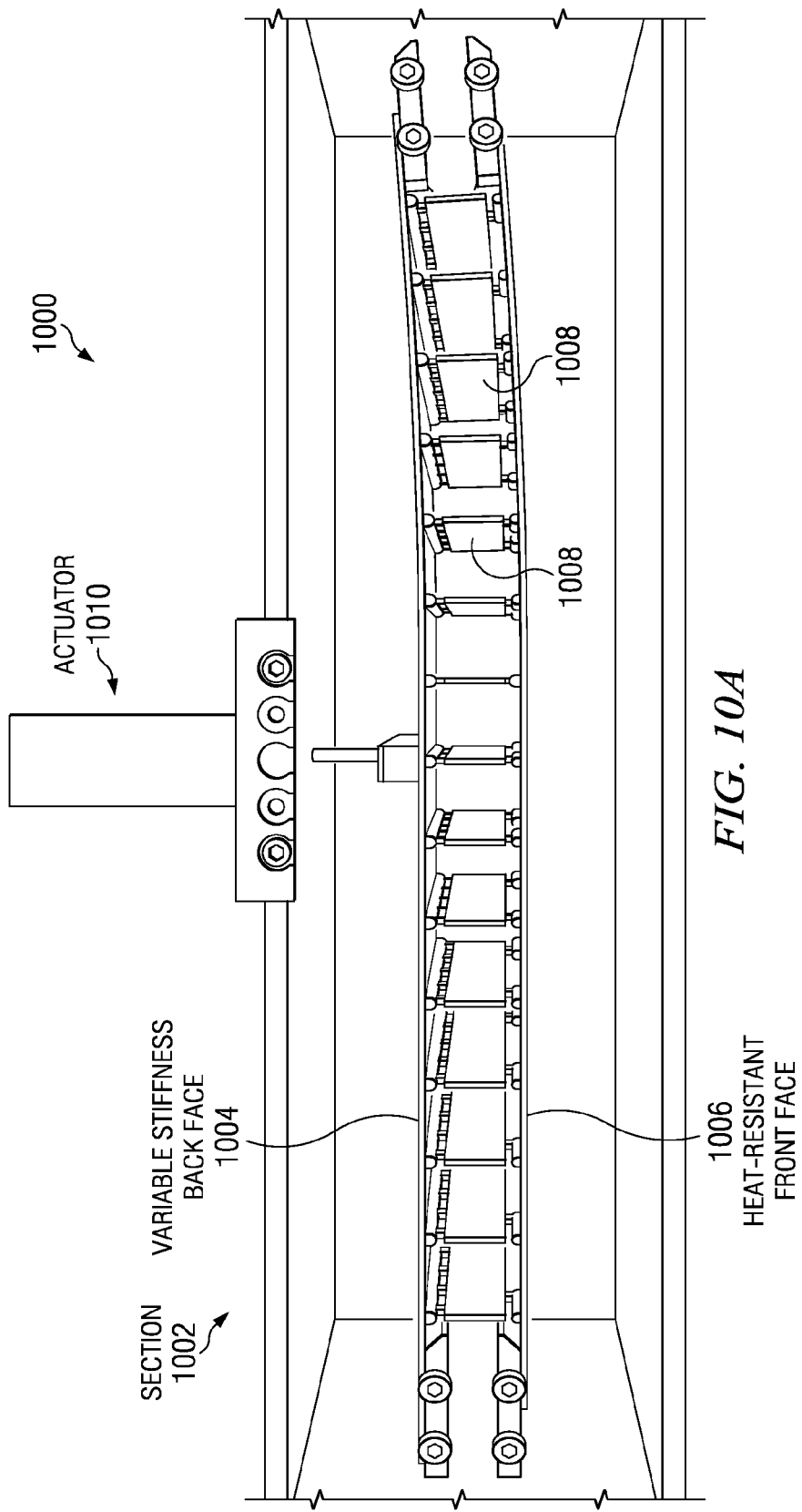
FIGS. 10A-10B are a block diagram of a flexible wall system in accordance with an advantageous embodiment.
Figure 10B:
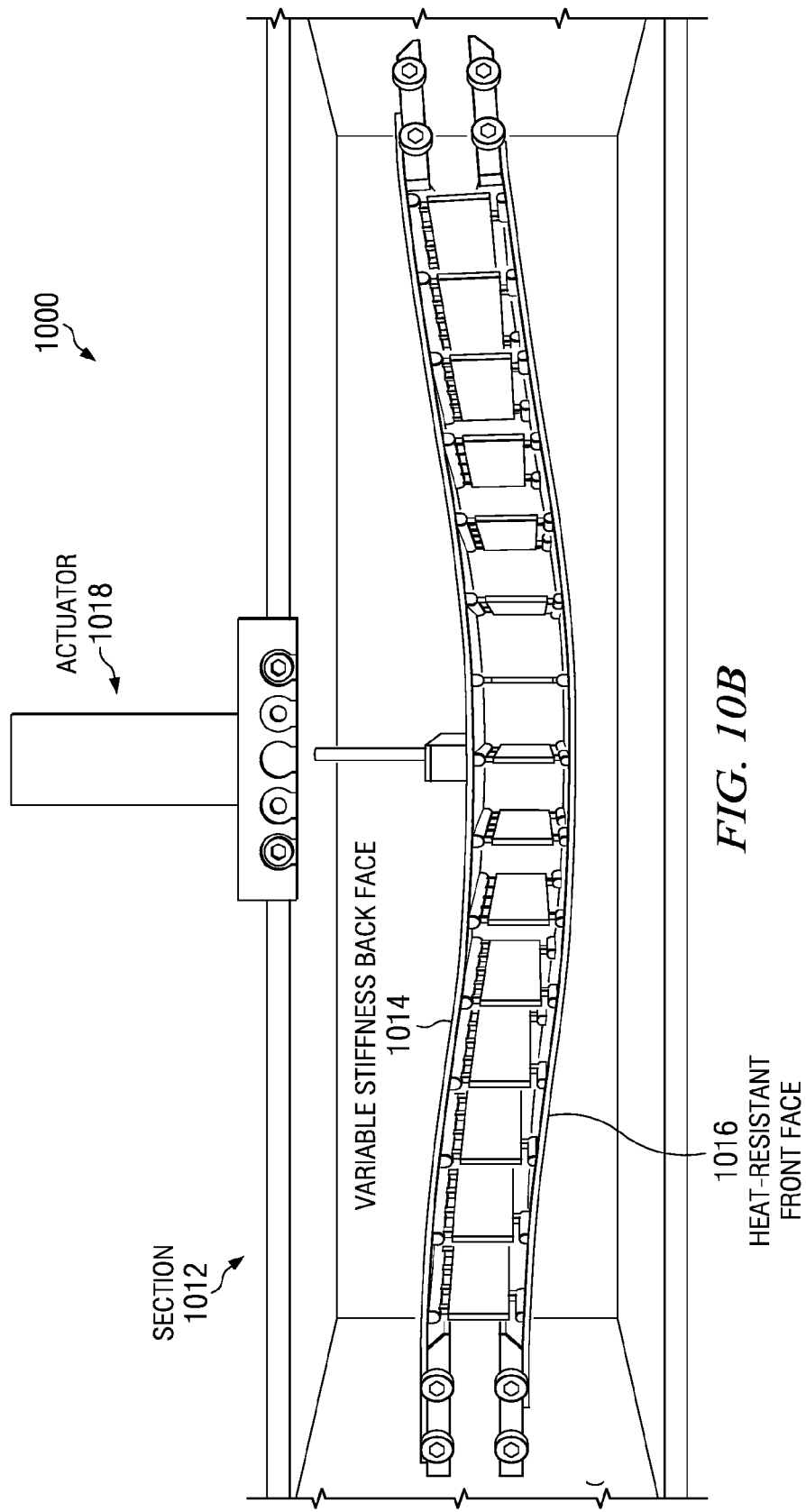

With reference now to FIGS. 10A-10B, a flexible wall system is depicted in accordance with an advantageous embodiment. Flexible wall system 1000 is an example of flexible wall system 400 in FIG. 4 and flexible wall system 900 in FIG. 9.

Section 1002 depicts variable stiffness back face 1004 and heat-resistant front face 1006 separated by standoff plates 1008 in a normal shape. Actuator 1010 is applying normal or no force. In both FIGS. 10A and 10B, the actuator (1010 and 1018) is mounted to the fixed back wall, such as back wall 814 in FIG. 8, of the structure in order that the actuator can react forces required to adjust the flexible wall shape. Section 1012 depicts variable stiffness back face 1014 and heat-resistant front face 1016 in a morphed shape due to force being applied by actuator 1018.

With reference now to FIG. 11, a flowchart illustrating a process for manufacturing a flexible plate is depicted in accordance with an illustrative embodiment. This process may be implemented during component and subassembly manufacturing 106 in FIG. 1.

The process begins by determining shapes required for a morpheable structure (step 1102). These shapes may be determined based on a type of wall that will undergo pressure. For example, in an illustrative embodiment, the shapes may be determined based on the type of engine in a hypersonic aircraft or missile, the highest mach speed that will need to be accommodated, and the amount of g-force the engine will have to endure. Next, the process determines the material attributes required to achieve the required shapes (step 1104). The material attributes may be, without limitation, a degree of thickness in the material used, a type of material used, or a type of filler added to a type of material used. Then, the process tailors parts of the material according to the material attributes determined (step 1106), with the process terminating thereafter.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a flexible structure comprising variable stiffness plates, wherein each variable stiffness plate of the variable stiffness plates is configured to have a desired degree of flexibility;
   an actuator system connected to the flexible structure, wherein the actuator system includes a number of actuators, and wherein the actuator system is configured to change a configuration of the flexible structure; and
   a controller connected to the actuator system, wherein the controller is configured to change a position of the number of actuators within the actuator system.

2. The apparatus of claim 1, wherein the flexible structure is comprised of a heat-resistant material.

3. The apparatus of claim 1, the flexible structure further comprising:
   flexible heat-resistant panels, wherein the flexible heat-resistant panels are configured to withstand operational temperatures.

4. The apparatus of claim 3, further comprising:
   a number of flexible pressure isolation plates, wherein the number of flexible pressure isolation plates are placed in juxtaposition to the flexible structure to form local pressurized volumes behind the flexible structure.

5. The apparatus of claim 4, further comprising:
   a number of pressure feeds, wherein the number of pressure feeds adjusts the local pressure in the local pressurized volumes behind the flexible structure.

6. The apparatus of claim 3, further comprising:
   standoff plates, wherein the standoff plates separate the flexible heat-resistant panels from the variable stiffness plates.

7. The apparatus of claim 6, further comprising:
   a cooling system in thermal communication with the flexible heat-resistant panels.

8. The apparatus of claim 7, wherein the cooling system includes thermal insulation.

9. The apparatus of claim 7, wherein the cooling system is configured to circulate a cooling fluid in thermal communication with the flexible heat-resistant panels.

10. The apparatus of claim 3, the flexible structure further comprising:

standoff plates positioned between the flexible heat-resistant panels and the variable stiffness plates, wherein the flexible heat-resistant panels, the standoff plates, and the variable stiffness plates form a sandwich structure.

11. The apparatus of claim 1, wherein a desired degree of flexibility of a variable stiffness plate of the variable stiffness plates is achieved by varying a thickness of the variable stiffness plate.

12. The apparatus of claim 1, wherein the number of actuators are situated to move a portion of the flexible structure from a first position to a second position.

13. The apparatus of claim 1, wherein the apparatus is selected from at least one of an engine, a wind tunnel, and an external control surface.

14. The apparatus of claim 1, wherein a desired degree of flexibility of a variable stiffness plate of the variable stiffness plates is achieved-by varying a type of material used to manufacture the variable stiffness plate.

15. The apparatus of claim 1, wherein a desired degree of flexibility of a variable stiffness plate of the variable stiffness plates is achieved-by varying a type of filler used to manufacture the variable stiffness plate.

16. A method comprising:
determining a number of shapes required for a flexible structure;
determining a number of material attributes required to achieve the number of shapes; and
locally tailoring a number of materials according to the number of material attributes to form variable stiffness plates, wherein the variable stiffness plates are part of the flexible structure, the flexible structure connected to an actuator system, wherein the actuator system includes a number of actuators, and wherein the actuator system is configured to change a configuration of the flexible structure, the actuator system connected to a controller, wherein the controller is configured to change a position of the number of actuators within the actuator system.

17. The method of claim 16, wherein the number of material attributes required to achieve the number of shapes includes at least one of a thickness, a type of material, and a type of filler added to the type of material.

18. The method of claim 16 further comprising:
identifying, by the controller, a wall configuration for the flexible structure; and
sending, by the controller, a command to the actuator system, wherein the command includes instructions for applying force to achieve the wall configuration identified.

19. The method of claim 18, wherein the actuator system receives the command and applies force to the flexible structure according to the command.

20. The method of claim 19, wherein the number of materials are tailored according to the number of material attributes so that desired shapes can be achieved using a reduced number of actuators.

* * * * *